__United States Patent Office__

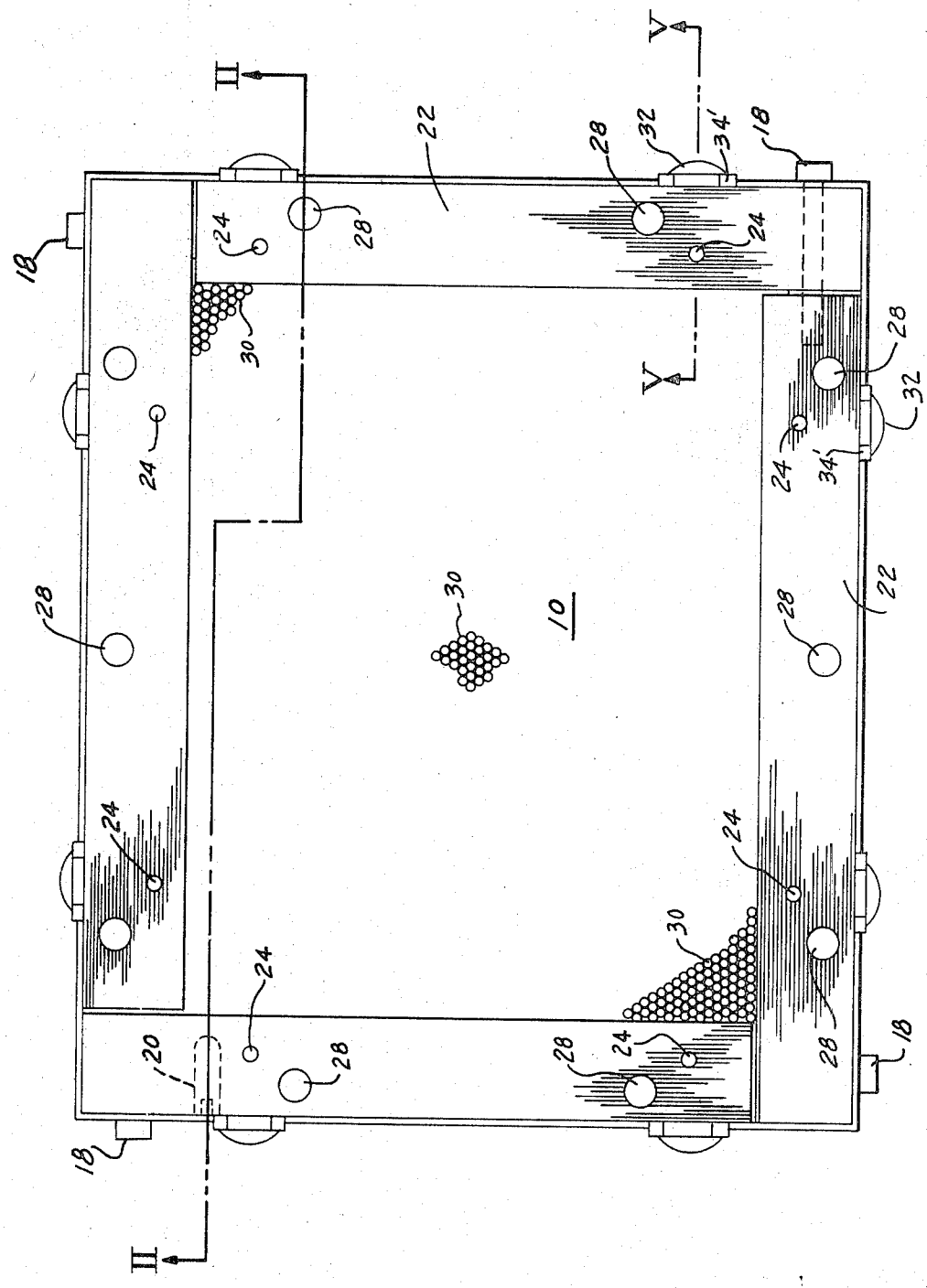

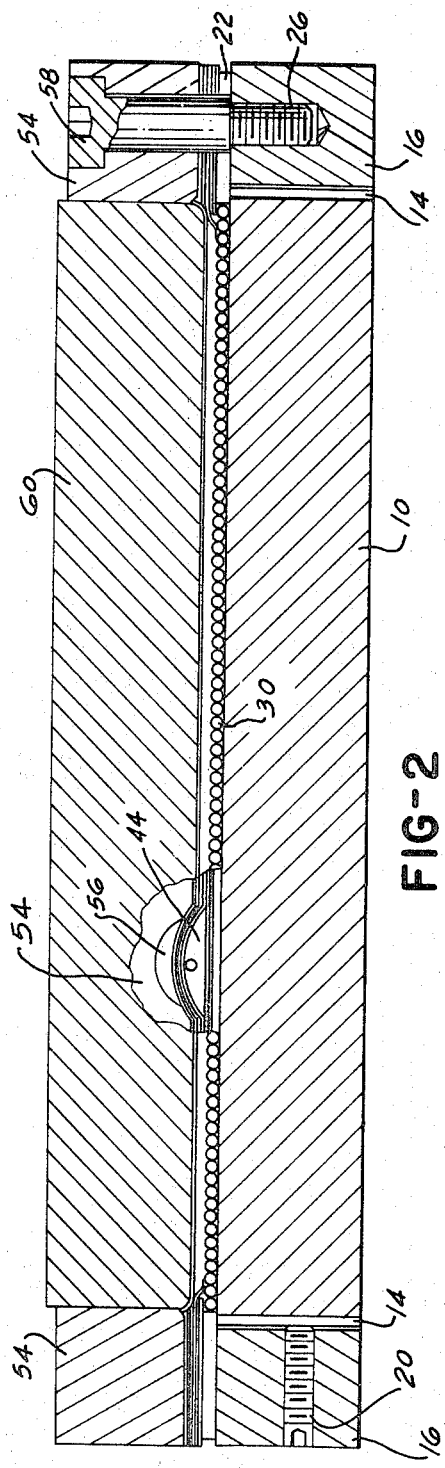
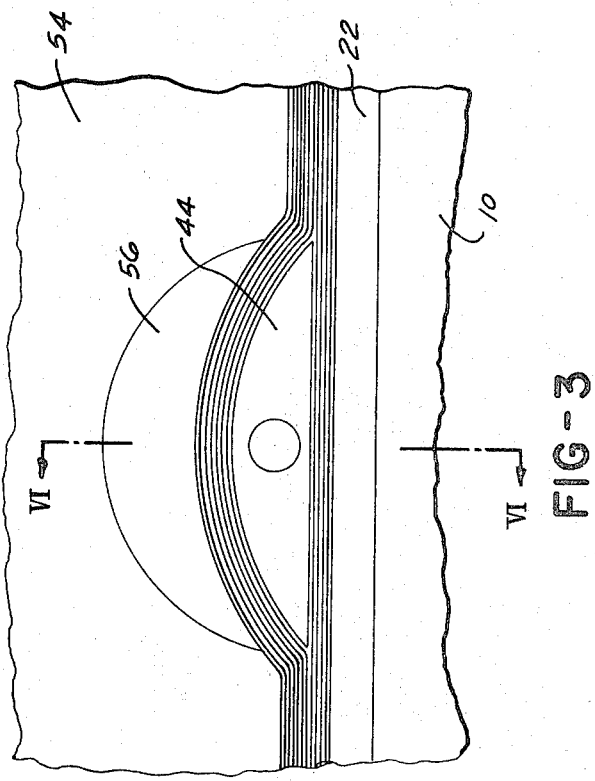

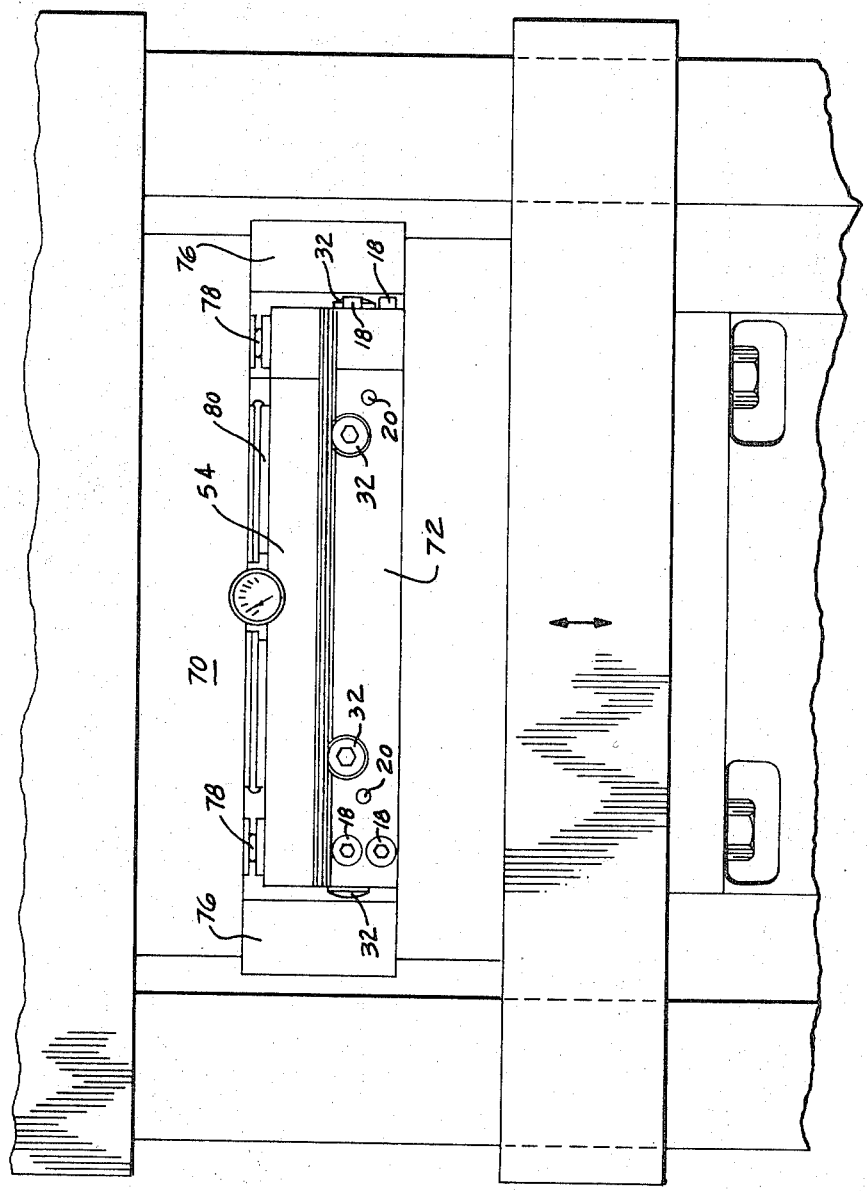

3,553,783
Patented Jan. 12, 1971

3,553,783
APPARATUS AND METHOD FOR FORMING A MOLD FOR LENTICULAR SHEET
Roger L. de Montebello, 165 E. 66th St.,
New York, N.Y. 10021
Filed Oct. 6, 1967, Ser. No. 673,451
Int. Cl. B29c 1/16; B29d 11/00
U.S. Cl. 18—19                                  2 Claims

ABSTRACT OF THE DISCLOSURE

The present invention provides an apparatus and a method for forming a mold member to form a transparent sheet which comprises a closely packed array of lenslets having convex spherical surfaces on at least one of its faces. A flat hard surface is provided with surrounding margin members which are adjustable toward and away from each other. On the surface within the margin members is arranged a closely packed array of spherical balls, usually ball bearings, one layer deep and all of the same diameter, the thickness of the margin members being substantially equal to the diameter of the balls. After the space between the margin members has been filled, the margin members are adjusted to compress the array of balls so that each of the balls is in firm contact with its neighboring balls, or with a margin member. The single layer array of balls is then covered with a sheet of thermoplastic material and a second layer of similar material, with one or more thin spouts protruding into the space between the two layers so that a thermosetting resin may be forced into the space between the two layers thereby forming a resilient cushion. Around the edges of the ball array, there are preferably provided shim members over the margin members, the shim members overlapping at least the first row of balls on each side of the ball-filled area, thereby covering the relatively large marginal cavity formed between any two adjacent balls next to the margin member. Other marginal resilient members or gaskets may also be provided as desired.

Heavy clamping bars having recesses to accommodate the spouts are provided over the marginal members, shims and gaskets and these bars are secured to make the edges of the plastic sheets fluid-tight. Long bolts or pins are provided through the plastic sheets, shims, margin members and clamping bars so as to secure the assembly and provide register points which are useful in the later use of the mold member to be formed.

A settable fluid resin, preferably a thermosetting resin, is then introduced under slight pressure into the space between the plastic sheets, through one or more of the spouts provided therebetween, after which the assembly of plastic sheets and fluid resin is subjected to heat and pressure to deform the sheet of plastic in contact with the balls as well as to set the fluid resin forming a cushion between two plastic sheets. The pressure is then continued on the assembly while the resin cools, thereby substantially eliminating shrinkage and deformation of the cushion.

When cool, a thick, rigid back-up plate is cemented over the top of the set cushion and this cemented assembly is removed from the molding assembly, and the edges may be trimmed. The set cushion assembly may be directly used as a casting cavity. For this purpose its embossed face is preferably made of a fluorohalo-carbon film such as "Aclar" film; or the cushion is sprayed with silver or vapor-plated with a thin layer of an electrically conductive metal, such as chromium, after which it is plated with a thicker layer of a solid metal such as nickel. The back of the electrodeposited metal may then be machined to provide a flat surface and/or may be reinforced with a thick rigid back-up plate, and after separation of the electrodeposited metal from the plastic cushion and if necessary after machining the periphery of the electrodeposited metal, the latter forms a durable master for pressing a new plastic cushion or for electroforming a curable mold for the production of lenticular sheets composed of convex spherical lenslets, suitable for use in integral photography according to the Lippmann process or more especially according to the process disclosed in my copending application Ser. No. 600,957 filed Dec. 12, 1966.

BACKGROUND OF THE INVENTION

Description of the prior art

The prior art describes many processes of integral photography, especially for the production of integral photographs by the use of sheets having arrays of pinholes, using crossed lenticular screens, and also lenticular sheets including small arrays of lenslets have been laboriously prepared by machining or peening individual concave cavities in a mold member. All suffer from the defect of producing relatively crude lenticular sheets which operate imperfectly and produce integral photographs of poor quality.

Field of the invention

The present invention relates to the production of mold members which may serve for the accurate and relatively simple formation of transparent lenticular sheets having closely packed lenslets with convex spherical surfaces which are especially adapted for use in integral photography. A special object of this invention is to provide mold members which are so near perfectly uniform arrays of cavities that two replicas can be placed face to face and have their cavities correspond one by one in almost perfect coaxial or concentric register for coacting or otherwise forming two-faced lenticular sheets, which sheets have their lenslets in near perfect coaxial or concentric register.

SUMMARY OF THE INVENTION

According to the present invention, there is provided a hard flat surface, usually rectangular, on which is arranged a single layer of hard spherical balls, all of the same diameter, surrounded by marginal members which may be moved relatively to each other to bring and hold the balls in a closely packed and preferably hexagonal array, the marginal members having approximately the same height as the diameter of the balls. Over the marginal members and partially overlying the outer row or rows of balls are arranged one or more frisket members to obscure the relatively large spaces which are present between adjacent balls at the edges of the array. Over the array of balls and the gasketing margin members are positioned two sheets of heat deformable plastic material. One or more spouts being provided, through which a settable fluid plastic may be introduced and confined between the sheets in order to exert uniform fluid pressure on the bottom sheet at the same time that the fluid plastic is set or hardened to provide a reinforcing support for the deformed plastic sheet in contact with the balls. The second spout, if used, forms a vent. Both spouts are closed after injection to keep the fluid plastic confined.

Clamping members firmly secure the plastic sheets and prevent leakage of fluid between them at their edges, while being provided with appropriate recesses to accommodate the spouts in order to permit the fluid settable plastic to be introduced between the sheets. The lower sheet of plastic in contact with the balls serves not only to form the mold face, but also serves to prevent the fluid plastic from entering the space between the balls, and if this does occur, due, for instances, to perforation of said sheet, there may result a useless mass of balls cemented together by a plastic matrix from which neither the balls nor the plastic can be usefully removed, rendering both of no further use. An additional, separate sheet of plastic may be provided between the cushion and the balls as additional protecttion and/or so as to modify the shape of the embossed cavities of the cushion.

A thick upper plate member acting as a position is then positioned over the assembly of plastic sheets and fluid plastic, suitable registering pins or bolts being provided in the marginal areas of the assembly. The assembly is then placed in a press.

The press platen members are preferably heated, and the assembly is then subjected to heat and pressure, the extent of the pressure and heat being controlled and the spacing of the upper platen member from the lower platen member being controlled by appropriate bearer blocks which limit the depth of penetration of the lower sheet into the ball bearing array. After a time suitable to the fluid plastic at the temperature involved, the fluid plastic has forced the lower plastic sheet into the ball array and becomes set so as to provide a solid, firm matrix, accurately reproducing the surface of the ball array. The platens are then cooled while the pressure is maintained on the plastic sheet and set fluid plastic so that the set plastic fluid may reach its desired hardness and that the inevitable shrinkage does not destroy the precise shape and horizontal dimensions of the reproduction of the ball array.

When sufficiently cooled, the assembly is removed from the press, a thick rigid back-up plate is cemented on top of the set plastic cushion, the clamping bars are removed, the plastic cushion assembly is removed and separated from the balls. Thereafter the embossed face of the plastic cushion is sprayed or vapor-plated with a thin layer of a conductive metal and is further subjected to heavy electroplating of a metal, such as nickel, after which the back of the electroplated metal may be machined to provide a flat surface and/or backed-up with a thick rigid flat ground plate. The edges of the electroplated metal may then be machined to the required dimensions. This constitutes a master on which more mold members may be pressed as above, or electroformed. When pressing, an additional sheet may be cemented over the electroformed master, and the outer face of this cemented sheet may be used to electroform a new, differently shaped master. Thus there are formed mold members from which lenticular sheets with accurately formed lenslets surfaces may be molded by injection molding, by stamping or other conventional molding methods. Alternatively, the mold may be covered with a film having adequate releasing properties, such as a fluorohalocarbon, and used for casting. Alternatively, the plastic sheets used in carrying out the invention may be a fluorohalocarbon, and the hardened mold member may be used directly to cast, e.g., a polyester resin.

BRIEF DESCRIPTION OF THE DRAWINGS

FIG. 1 is a top plan view of a base member for use with the present invention, the base member being partially filled with hard balls of uniform size;

FIG. 2 is a cross sectional view of the base member shown in FIG. 1, taken on the line II—II with certain parts added;

FIG. 3 is a fragmentary side elevation showing in detail one of the injection spouts;

FIG. 7 is a schematic view showing the assembly of the previous figures as placed in a press to subject the parts to the molding operation.

DESCRIPTION OF THE PREFERRED EMBODIMENT

Figure 5:
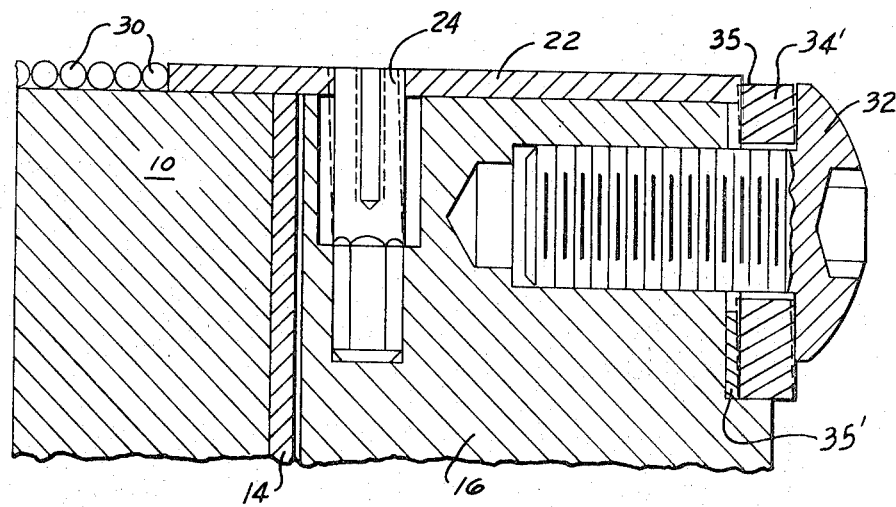
FIG. 5 is a fragmentary cross-sectional view taken on the line V—V of FIG. 1.
Figure 6:
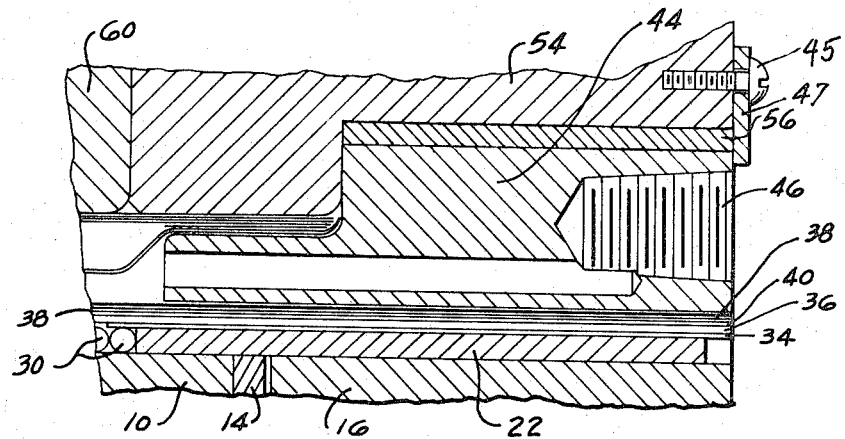
FIG. 6 is a fragmentary cross-sectional view taken on the line VI—VI of FIG. 3.
Figure 4:
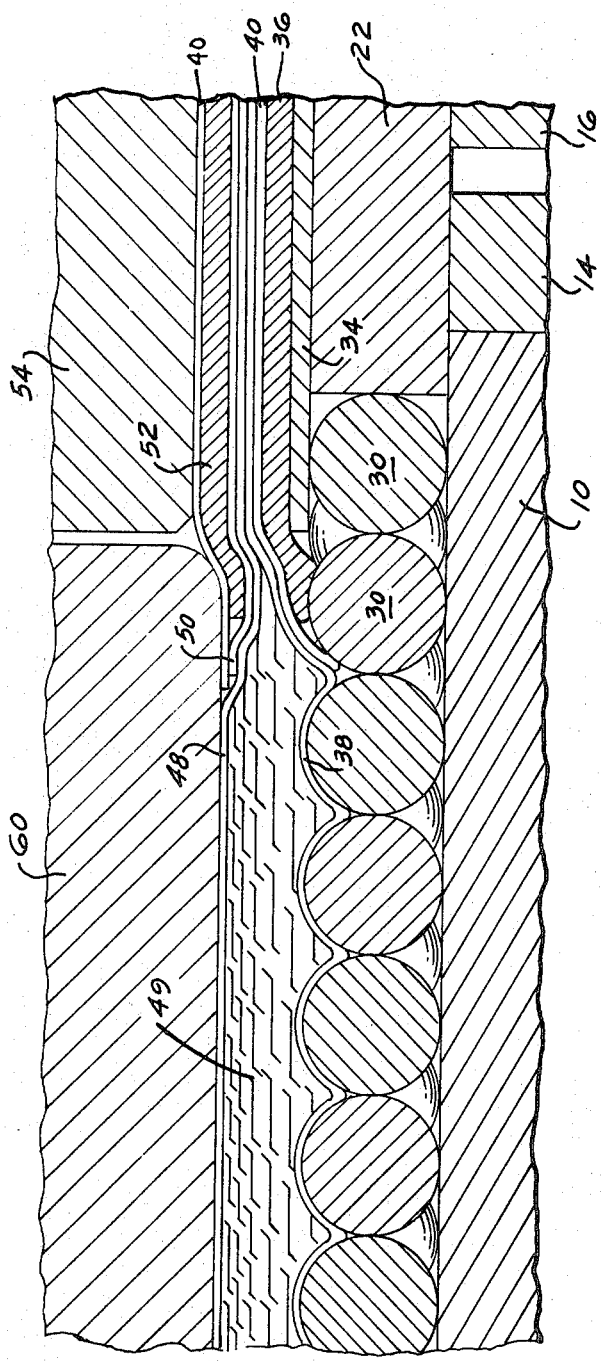
FIG. 4 is a detailed, fragmentary cross-sectional view showing schematically portions of one form of the apparatus of the present invention, as pressure is applied to the several layers overlying the array of balls on the hard base member.
Figure 8:
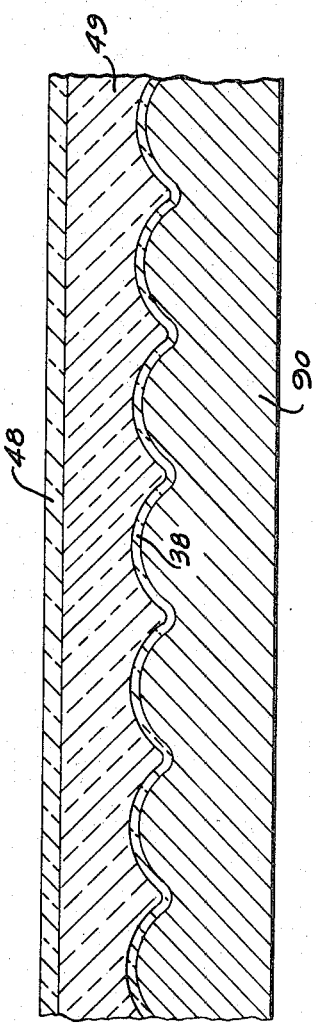
FIG. 8 is a fragmentary cross-sectional schematic view showing a matrix member as produced using the apparatus of the previous figures, and as completed by electrodeposition.

It will be understood that the foregoing general description, and the following detailed description of one embodiment as well, are exemplary and explanatory of the invention but are not restrictive thereof.

A base member 10 of aluminum or other metal is provided having a sufficiently large flat surface, somewhat larger than the lenticular sheet to be produced. Preferably the base member is rectangular, relatively thick and formed with edges which are perpendicular to the surface of the member. Adjacent at least two of the four sides of the base member are replaceable thin bars of steel 14, and spaced from the bars 14 are four heavy frame members 16, positioned end to edge and held together by means of socket head cap screws 18 which pass through frame members 16 and are threaded into the end of the adjacent frame member 16. Thus there is provided a rigid frame surrounding the base member 10 and its adjacent steel bars 14, with some clearance being provided between the frame and the base member 10. At least two of the frame members 16 are provided with set screws 20 which pass through threaded holes in the frame members 16 at widely spaced points towards the base member 10 and may be screwed inwardly to enage the bars 14 thereby holding the base member firmly with respect to the frame member and in an attitude dictated by a large supporting plate, not shown, on which the base member and frame member are both resting. Large shims under the base plate may be used, to raise it to the desired level. The bars 14 may be easily replaced if they become damaged through usage.

Surrounding the base member 10 and overlapping the surface of the base member are four margin members 22 which may be firmly secured to the frame members 16, and may also be moved toward and from the central area of the surface of the base member 10 so as to reduce or enlarge the surface area within the margin members 22. These margin members are staggered, that is the end of one margin member 22 is positioned close to but slightly spaced from one end of the side of an adjacent margin member, as shown in FIG. 1.

Each of the frame members 16 is provided with a plurality of upwardly extending resilient pins 24, closely fitted in sockets in a frame member, the upper end of the pins extending through closely fitting holes in the margin members 22, while the upper portion of the pins 24 remain free to move and spring load the frame members 16 due to a clearance provided by the uppr portion of the holes in which the pins 24 are seated.

Each of the frame members 16 is also provided with a plurality of widely spaced threaded holes 26 which register with clearance holes 28 in the margin members. These holes serve to receive clamping bolts by which superimposed frame members (to be described later) may be inserted to clamp layers of plastic material covering the area of the base member 10.

With the margin members 22 in the positions shown in FIG. 1, the upper face of the flat base member 10, within the area defined by the margin members is carefully filled with spherical balls 30 of uniform size. Illustratively, these balls 30 are ordinarily rather small, and a diameter of $3/32''$ is a convenient size, although much smaller or much larger balls may be used in the same manner and with the same apparatus. The area is filled with these spherical balls, which are preferably stainless steel bearing balls, carefully graded for size, and they are closely packed, preferably in hexagonal array, with each of the balls in contact with its six adjacent balls, although under special circumstances and less advantageously, the balls might be arranged in a square array. In their hexagonal array, the balls resemble the pattern of a honeycomb. When the area within the margin members 22 has been covered with a single layer of balls 30 uniformly packed there is inevitably some clearance between some of the balls. To eliminate this clearance and to force the balls into best contact with each other and with the margin members 22, at least two adjacent margin members 22 are moved towards each other and towards the other two margin members, preferably pre-set at a true 90° angle to very close tolerance until the balls are all in contact with each other or with one of the margin bars 22. To accomplish this compacting of the ball array, the frame members 16 (FIG. 5) are provided with horizontal threaded holes into which cap screws 32 may be screwed. Cap screws 32 are provided with washers 34' cut-off at their upper edge 35 and with a shim member 35', the thickness of the shim being determined empirically. Each washer 34' bears against the outer edge of its margin member 22 so that as screws 32 are tightened the margin members are forced inwardly against their resilient pin 24 to force the balls against each other and into a compact hexagonal array without causing any of them to raise from the surface of the base member 10. Preferably, the thickness of the margin members 22 is substantially the same as the diameter of the balls 30. The powerful restraining force of the screws 32 pressing against the margin members 22 and against the strong resilient pins 24 is necessary due to the radial pressure which is exerted on the margin members by the balls 30 as a vertical pressure is applied to the ball array during the later molding process, so that there occurs no spreading at all of the balls.

FIG. 5 of the drawings illustrates a portion of the base member provided with a single layer array of balls, and with the margin members 22 held against movement by the cap screws 32 and exerting pressure on the resilient members 24.

The base member 10 with its marginal members 22 will sometimes be referred to as a tray.

Once the tray has been filled with balls 30 in their hexagonal or square array and they have been brought into contact with each other by the compression screws 32 so that they can have no substantial movement with respect to each other with pressure applied normal to the surface of base member 10, preparations are made for the molding operation which is to take place at a later stage.

Protective metal strips 34 are provided to overlie the margin members 22, the inner edges of the strips 34 extending into the molding area and preferably covering at least the outer row of balls 30. The purpose of this strip is to occlude the relatively large spaces which inevitably exist between adjacent balls 30 and their adjacent margin strip 22, thereby tending to prevent a moldable layer superimposed on the assembly from entering th odd space between adjacent balls and the margin member. Further, in order to prevent the moldable material from becoming stretched and tearing at the edges of the ball array, gasket 36 which may be of a soft porous material such as blotting paper, are provided and extended beyond the inner edges of the strips 34, thereby avoiding contact of the next upper layer with the often sharp edges of the strips 34. Thus, usually the outer two rows of balls 30 are shrouded with a protective gasket frame.

The next layer applied to the ball array is a sheet of heat deformable plastic material, illustratively about 0.005'' thick. While many plastic materials may be used, such as vinyl sheet, cured sheets of thermosetting resins, etc., it is preferred to use a sheet of a fluorohalocarbon resin, such as "Aclar."

Fluorohalocarbon resin sheets are preferred when the matrix is to be used directly as a casting mold due to the ease with which the cast is released after molding.

The resin sheet 38 is sufficiently large to cover the ball array and the margin members 22, is perforated to receive the screw threaded members to pass through the holes 28, and is smoothed over the surface of the ball array. For added protection against eventual rupture, additional gasket frames 40 may be provided over the soft frame 36.

Intermediate the ends of one of the margin strips 22, and overlying the strips 34, the frames 36 and 40, and the sheet 38, is positioned at least one thin narrow spout 44 through which fluid plastic material may eventually be fed to the area over the ball array, and a similar spout (not shown) is provided on the opposite side through which air between the sheets 38 and 44 may be bled as resin is introduced through the first spout. Each spout 44 is provided with a threaded opening 46 into which the threaded end of a nozzle may be screwed to feed fluid plastic through the spout into the space on top of resin sheet 38. The spouts are held in place, e.g., with thin double faced adhesive tape on sheet 38, and by screw 45 and washer 47.

A second resin sheet 48 is positioned over resin sheet 38 and over the inner end of the spout 44 itself covered with a strip of double faced tape. Over the margins of sheet 48 is positioned a frame of plastic 50 and a thicker frame of soft material such as blotting paper 52, and small strips of blotting paper may be provided to overlie the outer end of spout 4, and small rubber strips to overlie the thin, inner end of the spout.

On top of the margin strips 22, frame members 16, the frisket strips 34, gasket frames 36, 40, 50, and 52, and the edges of sheets 38 and 48, are provided clamping bars 54, one of which is recessed as at 56 to accommodate the spout 44, and these clamping bars are forced against the layers of material intermediate the frame members 16 by means of screws 58 so as to provide a fluid-tight space between the sheets 38 and 48.

Thereafter, a measured quantity of a fluid thermosetting resin 49, such as Union Laboratories' special Aclar cement, an epoxy, is introduced through a spout 44 between the sheets 38 and 48 to separate these sheets from each other and to form a fluid layer between them so that hydraulic pressure may be applied to mold the bottom sheet into accurate conformity with the upper surface of the array of balls 30. When the measured quantity of cement has been delivered, the fluid between the layers 38 and 48 is kneaded, for instance by using a roller, to distribute the cement fairly evenly over the entire surface of the sheets between the margins of the sheets, as air is bled through the other spout 44. Thereafter the threaded holes 46 in spouts 44 are plugged.

When the fluid resin has been distributed between the resin sheets 38 and 48, a thick slab of metal 60 having parallel flat faces and only slightly smaller than the space between clamping bars 54 is positioned over the sheets 38 and 48 and the array of balls 30 and is lowered onto the upper sheet 48.

This whole assembly is then transferred to a hydraulic press which may be heated and cooled, and the whole assembly is heated by contact with the heated upper and lower platens of the hydraulic press while being subjected to pressure.

The hydraulic press is illustratively shown as having a stationary platen 70 and a vertically movable lower platen 72, both of which may be heated and cooled to heat and cool the mold assembly 10, 60 and the other parts including the fluid resin 49 and the resin sheets 38 and 48.

At either side of the mold assembly are positioned bearer blocks 76 to limit the upward travel of the platen 72 and at all four side edges clamping bars 54 are overlaid with sandwich strips 78 comprising metal strips with an intervening layer of resilient rubber.

A tubular thermometer 82 may be positioned in a suitable hole in the upper part of piston 60 to register the temperature of the piston, and the sandwich strips 78 are interrupted to allow for passage of the stem of the thermometer.

The sandwich strips 78 serve to apply powerful resilient pressure to thec lamping bars 54 so as to seal the marginal edges of the sheets 38 and 48 and prevent leakage of the cement from between the sheets as pressure is subsequently applied by the piston 60.

The height of the bearer blocks and the amount of cement between the sheets 38 and 48 determine the deformation of the sheet 38 and these are carefully adjusted so that the deformation amounts to approximately one-third the diameter of the balls 30. Set screws 20 are loosened before pressure is applied to allow the base member 10 to float with respect to frame members.

Pressure is applied gradually as the assembly, including the Aclar cement becomes heated and after about 40 to 45 minutes the temperature of the piston 60 and of the Aclar sheets and epoxy cement should reach about 150° F. with about 350 p.s.i. pressure. These time, pressure and temperature values will, of course, vary depending upon exact operating conditions and the precise nature of the plastic resins employed, but the data given has been found to be very satisfactory in actual practice with the materials described. The application of heat and pressure to the fluid resin sheets 38 and 48 causes the lower sheet 38 to be deformed into conformity with the upper surface of the ball array and also causes the thermosetting resin between the sheets 38 and 48 to become set.

After the mold has been formed, the plastic assembly is allowed to remain between the platens of the press, while the platens are cooled and the resin sheets and cement are also cooled while pressed against the balls so that lateral shrinkage of the resin members is substantially avoided, and the resin layers become stabilized as an accurate counterpart of the convex surface of the ball array.

The assembly is then removed from the hydraulic press and the piston 60 is temporarily removed and the bars 54 replaced with clamping devices to allow cement to flow out, after which a metal block (not shown) covered on one face with epoxy or other suitable cement is placed on top of the sheet 48, the piston 60 is then replaced and allowed to remain until the metal block has become bonded to the sheet 48 of the mold, while the whole assembly is back in the press with adequate pressure and adjusted bearers.

The clamps are then released and removed and the cured mold matrix with its metal block are lifted from the ball array, and the mold surface is carefully scraped with a plastic wedge to remove any of the balls 30 which cling to the mold face 38.

The mold comprising the sheets 38, 48, the set resin 49 and the backing block may then be trimmed and used for molding lenticular sheets, or alternatively the embossed face of sheet 38 may be vapor plated with a thin layer of chromium or other metal or sprayed, as with silver, and then electroplated with a thicker layer of a hard metal 94 to form a male master from which other Aclar casting molds may be pressed, or female dies electroformed and later used for compression molding.

A thick flat sheet, such as a polystyrene or polyvinylacetate-chloride copolymer, can also be used provided that it is properly confined, as is the fluid in the area between the layers 38, 48. A slightly different configuration is thus obtained with the interstices sharper. The sheet of thermoplastic resin must be clamped all around and pre-cemented to a thick backing plate. The clamping bars do not need to be screwed down but located with short pins, the sheet must be uniformly plane parallel, preferably within 0.0001 to 0.001″. The gasket members 36, 52 may be thinner than when used with the cement 49 forming the fluid pressure layer.

Using the sheet of solid thermoplastic resin, it is heated and subjected to molding pressure, after which it is allowed to cool while still under pressure to form a master mold and may be cemented to a rigid backing member before being separated from the ball array.

The invention in its broader aspects is not limited to the specific steps, processes, compositions and mechanisms shown and described but departures may be made therefrom within the scope of the accompanying claims without departing from the principles of the invention and without sacrificing its chief advantages.

What is claimed is:

1. Apparatus for making a mold member to form a sheet having a closely packed array of lenslets with convex spherical surfaces, including in combination a flat hard surface, margin members enclosing an area on said surface, a plurality of spherical balls in closely packed array on said surface filling the area within the margin members, the balls being of the same diameter, which diameter is substantially equal to the thickness of the margin members, bars overlying said margin members for clamping at least one sheet of plastic over the array of balls, means closely fitted to said bars on said margin members for applying pressure to said sheet of plastic to conform said sheet to the shape of the exterior face of said array of balls, spring loaded members for engaging the margin members and controlling the movement thereof parallel to the flat hard surface, means for moving the margin members against the spring loaded members and toward the array of balls, and spouts extending through the clamping bars, whereby a plurality of sheets of plastic may be positioned over said array of balls and clamped by the clamping bars and fluid resin to be molded by said balls may be introduced between the sheets of plastic through said spouts.

2. Apparatus for making a mold member to form a sheet having a closely packed array of lenslets with convex spherical surfaces, including in combination a flat hard surface, margin members enclosing an area on said surface, a plurality of spherical balls in closely packed array on said surface filling the area within the margin members, the balls being of the same diameter, which diameter is substantially equal to the thickness of the margin members, bars overlying said margin members for clamping at least one sheet of plastic over the array of balls, means closely fitted to said bars on said margin members for applying pressure to said sheet of plastic to conform said sheet to the shape of the exterior face of said array of balls, spring loaded members for engaging the margin members and controlling the movement thereof parallel to the flat hard surface and, means for moving the margin members against the spring loaded members and toward the array of balls, whereby a relatively thick plastic sheet having means for retaining said relatively thick plastic sheet rigid may be clamped to the clamping bars until a mold member is formed thereof.

References Cited

UNITED STATES PATENTS

| | | | |
|---|---|---|---|
| 2,834,231 | 5/1958 | Gruetzner | 76—4X |
| 2,861,372 | 11/1958 | Hunt | 76—107X |
| 3,187,606 | 6/1965 | Ohntrup | 76—107 |

(Other references on following page)

UNITED STATES PATENTS

| | | | |
|---|---|---|---|
| 3,288,045 | 11/1966 | Harding | 95—18 |
| 3,346,923 | 10/1967 | Brown | 18—19 |
| 3,406,428 | 10/1968 | Brown | 18—19 |
| 3,416,194 | 12/1968 | Miller | 18—19 |
| 3,465,386 | 9/1969 | Brown | 18—19 |
| 3,216,074 | 11/1965 | Harrison | 29—625X |
| 3,466,706 | 9/1969 | Asano | 18—19 |
| 3,475,521 | 10/1969 | Stroop | 18—19 |

OTHER REFERENCES

Harding, "Fly's-Eye Lens Technique for Generating Semiconductor Device Fabrication Masks," IBM Journal, April 1963, pp. 146–150 (esp. "Lens Fabrication," on p. 148). (Copy in 95—18–P.)

WAYNE A. MORSE, Jr., Primary Examiner

U.S. Cl. X.R.

18—35; 76—4, 107